(12) United States Patent
Iritani et al.

(10) Patent No.: US 6,515,448 B2
(45) Date of Patent: Feb. 4, 2003

(54) AIR CONDITIONER FOR HYBRID VEHICLE

(75) Inventors: Kunio Iritani, Anjo (JP); Keita Honda, Okazaki (JP); Hisashi Ieda, Nagoya (JP); Ken Matsunaga, Kariya (JP); Toshinobu Homan, Obu (JP); Mitsuyo Oomura, Hekinan (JP); Yuji Takeo, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/034,758

(22) Filed: Dec. 27, 2001

(65) Prior Publication Data

US 2002/0084769 A1 Jul. 4, 2002

(30) Foreign Application Priority Data

Dec. 28, 2000 (JP) ........................................ 2000-401232
Nov. 19, 2001 (JP) ........................................ 2001-353601

(51) Int. Cl.$^7$ ............................................. H01M 10/46
(52) U.S. Cl. ....................................... 320/104; 320/135
(58) Field of Search ................................ 320/103, 104, 320/127, 128, 134, 136, 135

(56) References Cited

U.S. PATENT DOCUMENTS 5,656,918 A * 8/1997 Pearman et al.
2002/0113576 A1 * 8/2002 Oomura et al.

FOREIGN PATENT DOCUMENTS

JP 9-76740 3/1997
JP 2000-270401 9/2000

* cited by examiner

*Primary Examiner*—Edward H. Tso
(74) *Attorney, Agent, or Firm*—Harness, Dickey & Pierce, PLC

(57) ABSTRACT

In an air conditioner for a hybrid vehicle, when a residual charging degree of a battery becomes equal to or lower than a target degree, the electrical motor generator is driven by a vehicle engine so that the battery is charged through the electrical motor generator. When the engine is driven, the target degree of the battery is set higher than that when the engine is stopped so that a charging operation tends to be required while the engines driven. Accordingly, the frequency for starting the engine only for charging the battery is reduced.

20 Claims, 12 Drawing Sheets

AIR CONDITIONER FOR HYBRID VEHICLE

CROSS-REFERENCE TO RELATED APPLICATION

This application is related to and claims priority from Japanese Patent Applications No. 2000-401232 filed on Dec. 28, 2000, and No. 2001-353601 filed on Nov. 19, 2001, the content of which is hereby incorporated by reference.

BACKGROUND OF THE INVENTION

1. Field of the Invention

The present invention relates to an air conditioner for a hybrid vehicle having an engine and an electrical motor for running the vehicle.

2. Description of Related Art

In a conventional hybrid vehicle disclosed in JP-A-2000-270401, an air conditioning unit for performing air-conditioning operation in a passenger compartment using electrical power supplied from a battery is provided. Further, when a residual charging degree of the battery becomes equal to or lower than a charging-starting target value (target degree), the battery is charged by driving a generator using a vehicle engine. While the vehicle is stopped or runs with a low load, the engine is stopped when the residual charging degree of the battery is higher than the charging target value.

However, in the above-described air conditioning unit, the battery is charged only when the residual charging degree becomes equal to or lower than the target degree, regardless the operation state of the engine. Therefore, even in a case where the vehicle is running while the engine is stopped, the operation of the engine is started only for charging the battery when the residual charging degree becomes equal to or lower than the target degree. When the vehicle engine is frequently driven only for charging the battery as in this manner, fuel consumption efficiency cannot be sufficiently improved.

SUMMARY OF THE INVENTION

In view of the above problems, it is an object of the present invention to provide an air conditioner for a hybrid vehicle, which sufficiently improve fuel consumption efficiency.

It is another object of the present invention to reduce frequent for driving an engine, only for charging a battery, in an air conditioner for a hybrid vehicle where the engine is controlled to be driven and stopped according to a vehicle running condition.

According to the present invention, in a hybrid vehicle having an engine for running the vehicle and an electrical motor generator for running the vehicle and for generating electrical power, when a residual charging degree of a battery becomes equal to or lower than a target degree, the electrical motor generator is driven by the engine to charge the battery. In addition, the target degree of the battery is set higher while the engine is driven, than the target degree of the battery while the engine is stopped. Because the target degree for starting the charging of the battery is set higher only while the engine is driven, the charging of the battery tends to be required while the engine is driven. On the other hand, while the engine is stopped, the charging of the battery tends not to be required. Therefore, the frequency for starting the engine only for charging the battery becomes lower. Generally, the engine thermal efficiency becomes higher as an engine load increases. Accordingly, the engine thermal efficiency becomes higher when the engine is driven for running the vehicle and for charging the battery, than the engine thermal efficiency when the engine is driven only for charging the battery. Thus, the engine is driven while having a high engine thermal efficiency, thereby improving fuel consumption efficiency and reducing an exhaust amount of environmental polluting matter.

Preferably, when an output of the engine is equal to or higher than a predetermined value, the target degree is set higher than that when the output of the engine is lower than the predetermined value. Alternatively, when a vehicle speed is equal to or lower than a predetermined speed, the target degree is set lower than that when the vehicle speed is higher than the predetermined speed. Alternatively, the target degree is set higher in a first running mode where a possibility for driving the engine is high, than that in a second running mode where the possibility for driving the engine is low. Alternatively, when a discharging degree of the battery is equal to or higher than a predetermined degree, the target degree is set lower than that when the discharging degree of the battery is lower than the predetermined degree. Accordingly, even in those cases, the fuel consumption efficiency can be effectively improved.

Preferably, the target degree is set higher as the air-conditioning necessary electrical power increases. Therefore, the charging degree of the battery can be increased with the increase of the air-conditioning necessary electrical power, while a time for which the engine can be continuously stopped can be made longer.

On the other hand, according to the present invention, air-conditioning capacity of the air conditioning unit is set lower while the -engine is stopped than the air-conditioning capacity while the engine is driven. Accordingly, while the engine is stopped, electrical load applied to the battery becomes low, so that the charging of the battery tends not to be required. Thus, the frequency for starting the engine only for charging the battery is reduced further, thereby improving fuel consumption efficiency and reducing the exhaust amount of environmental polluting matter. While the engine is driven, the air-conditioning performance of the air conditioning unit is set higher to improve an amenity in a passenger compartment of the vehicle.

Preferably, when a vehicle speed is equal to or lower than a predetermined speed, the air-conditioning capacity of the air conditioning unit is set lower than that when the vehicle speed is higher than the predetermined speed. Alternatively, when a discharging degree of the battery is equal to or higher than a predetermined degree, the air-conditioning capacity of the air conditioning unit is set lower than that when the discharging degree of the battery is lower than the predetermined degree. Alternatively, the air-conditioning capacity of the air conditioning unit is set lower in the first running mode where the possibility for driving the engine is low, than that in the second running mode where the possibility for driving the engine is high. Alternatively, when the residual charging degree of the battery is equal to or lower than a predetermined charging degree that is higher than the target degree, the air-conditioning capacity of the air conditioning unit is set lower than the air-conditioning capacity when the residual charging degree of the battery is higher than the predetermined charging degree. Alternatively, when a rotation speed of the engine is equal to or higher than a predetermined rotation speed, the air-conditioning capacity of the air conditioning unit is set lower than the air-conditioning capacity when the rotation speed of the engine is lower than the predetermined rotation speed. Alternatively, when a running load of the vehicle is equal to or higher than a predetermined load, the air-conditioning capacity of the air conditioning unit is set lower than the air-conditioning capacity when the running load is lower than the predetermined load. Alternatively, when the electrical motor generator is used for running the vehicle, the air-conditioning capacity of the air conditioning unit is set lower than the air-conditioning capacity when the electrical motor generator is used for generating electrical power. Accordingly, the frequency for starting the engine only for charging the battery is reduced, while the amenity in the passenger compartment of the vehicle can be effectively improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
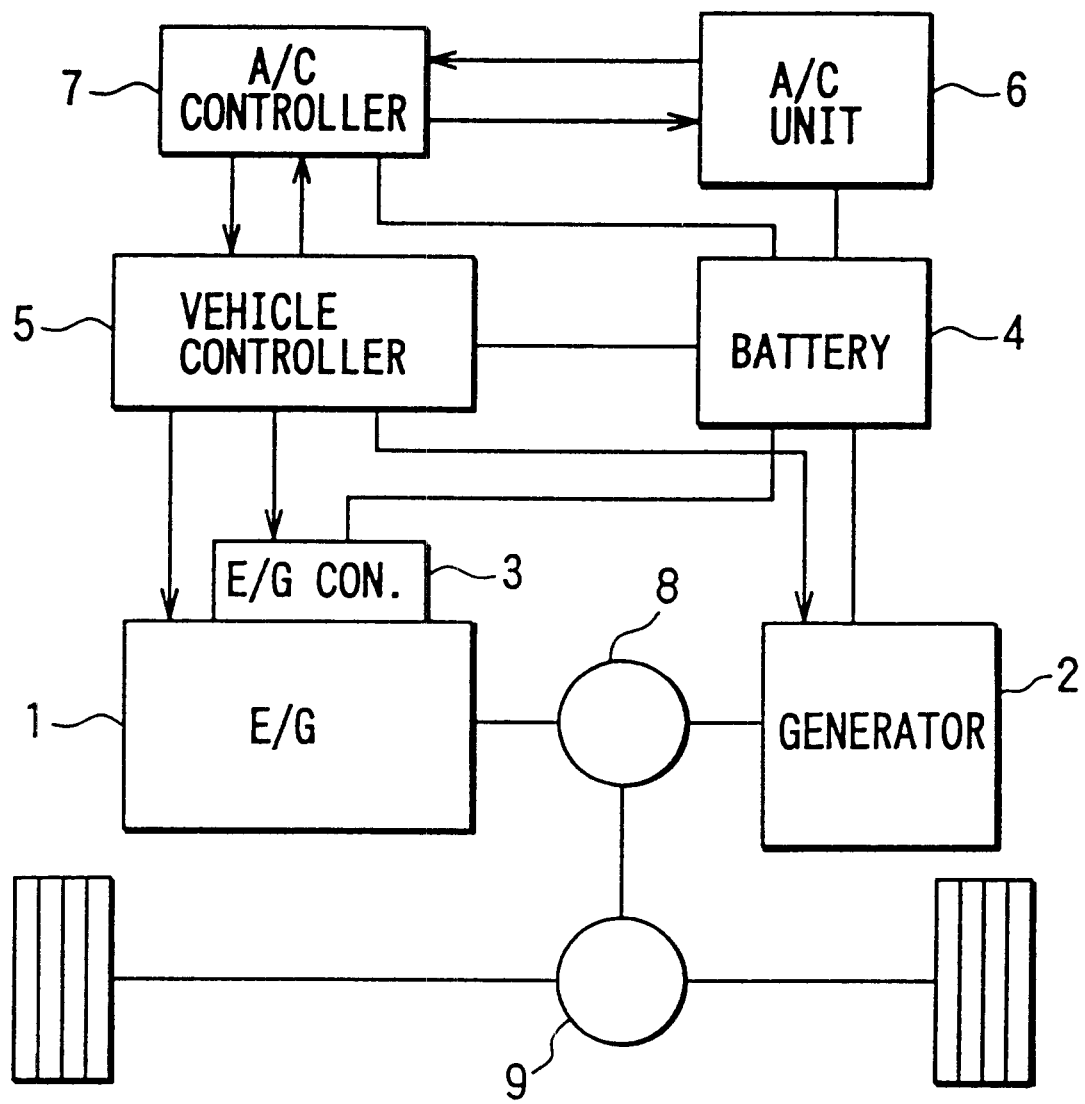
FIG. 1 is a schematic diagram showing a hybrid vehicle on which an air conditioner according to a first embodiment of the present invention is mounted.

A first embodiment of the present invention will be now described with reference to FIGS. 1–7. As shown in FIG. 1, a hybrid vehicle includes an internal combustion engine 1 using gasoline as a fuel, an electrical motor generator 2, an engine controller 3, a battery (e.g., nickel-hydrogen storage battery) 4 and a vehicle controller 5.

The electrical motor generator 2 has an electrical motor function for running the hybrid vehicle and a power generator function for generating electrical power. That is, when electrical power is supplied to the electrical motor generator 2 from the battery 4, the electrical motor generator 2 is operated as an electrical motor for generating motive power. On the other hand, when the electrical motor generator 2 is driven by the engine 1 or the like, the electrical motor generator 2 is operated as a power generator for generating electrical power.

The engine controller 3 suitably controls an amount of fuel supplied to the engine 1, an ignition timing and the like based on control signals from the vehicle controller 5, so that a rotation speed of the engine 1 and torque thereof can be controlled at target values, and high fuel-combustion efficiency can be obtained in the engine 1. The battery 4 supplies electrical power to the electrical motor generator 2, the engine controller 3, an air-conditioning unit 6 and the like. The vehicle controller 5 outputs control signals to the engine controller 3 while controlling the electrical motor generator 2 and a motive-power switching mechanism 8.

The motive-power switching mechanism 8 has a function for switching a transmission direction of motive power between the engine 1, the electrical motor generator 2 and a vehicle shaft 9. Specifically, the motive-power switching mechanism 8 can selectively switch between a state where only the power of the engine is transmitted to the vehicle shaft 9, a state where only the power of the electrical motor generator 2 to the vehicle shaft 9, a state where both the power of the engine 1 and the power of the electrical motor generator 2 are transmitted to the vehicle shaft 9, a state where the power of the engine 1 is transmitted to the electrical motor generator 2 and the vehicle shaft 9, and a state where the power of the engine 1 is transmitted only to the electrical motor generator 2.

The following control is basically performed by the vehicle controller 5. First, while the vehicle is stopped, the engine 1 is stopped. On the other hand, while the vehicle runs, the engine 1 is controlled to be started or stopped according to a vehicle running state (mainly, a vehicle speed and a running load). This control is performed in all embodiments in the present specification. Here, the running load is obtained from a pedaled amount of an accelerator pedal, for example. When the engine 1 is required to be driven, the engine 1 is started by the vehicle controller 5 using the electrical motor generator 2. In order to obtain certain driving force required for running the hybrid vehicle, the electrical motor generator 2 is controlled to be driven or stopped (e.g., inverter-controlling), and a rotation speed. thereof and the like are controlled by the vehicle controller 5. Further, a target rotation speed of the engine 1, a target torque thereof. and the like are outputted to the engine controller 3 from the vehicle controller 5.

The motive-power switching mechanism 8 is controlled by the vehicle controller 5, and only the motive power of the electrical motor generator 2 is transmitted to driving wheels of the hybrid vehicle when the vehicle is started and when the vehicle runs at a low speed or in a low load state. When the vehicle runs at a stable speed (at a medium speed or in a medium load state), only the motive power of the electrical motor generator 2 or the motive power of both the engine 1 and the electrical motor generator 2 can be transmitted to the driving wheels. When the vehicle runs at a high speed or in a high load state, the motive power of both the engine 1 and the electrical motor generator 2 is transmitted to the driving wheels. When the vehicle decelerates, the electrical motor generator 2 is driven using the motive power from the driving wheels while the engine 1 is stopped, so that the battery 4 is charged by the electrical motor generator 2.

When a residual charging degree of the battery 4 becomes equal to or smaller than a target degree for starting the charging of the battery 4, the engine 1 is driven, and the motive power of the engine 1 is transmitted to the electrical motor generator 2 through the motive-power switching mechanism 8. In this case, the electrical motor generator 2 is operated as a power generator, and the battery 4 is charged by the electrical motor generator 2.

The air conditioner includes an air conditioning unit 6 for performing air-conditioning control in a passenger compartment of the vehicle and the air-conditioning controller 7 for controlling components of the air conditioning unit 6. In the first embodiment, the air conditioner is an automatic-controlled air conditioner where the temperature in the passenger compartment is automatically controlled at a temperature set arbitrarily.

Figure 2:
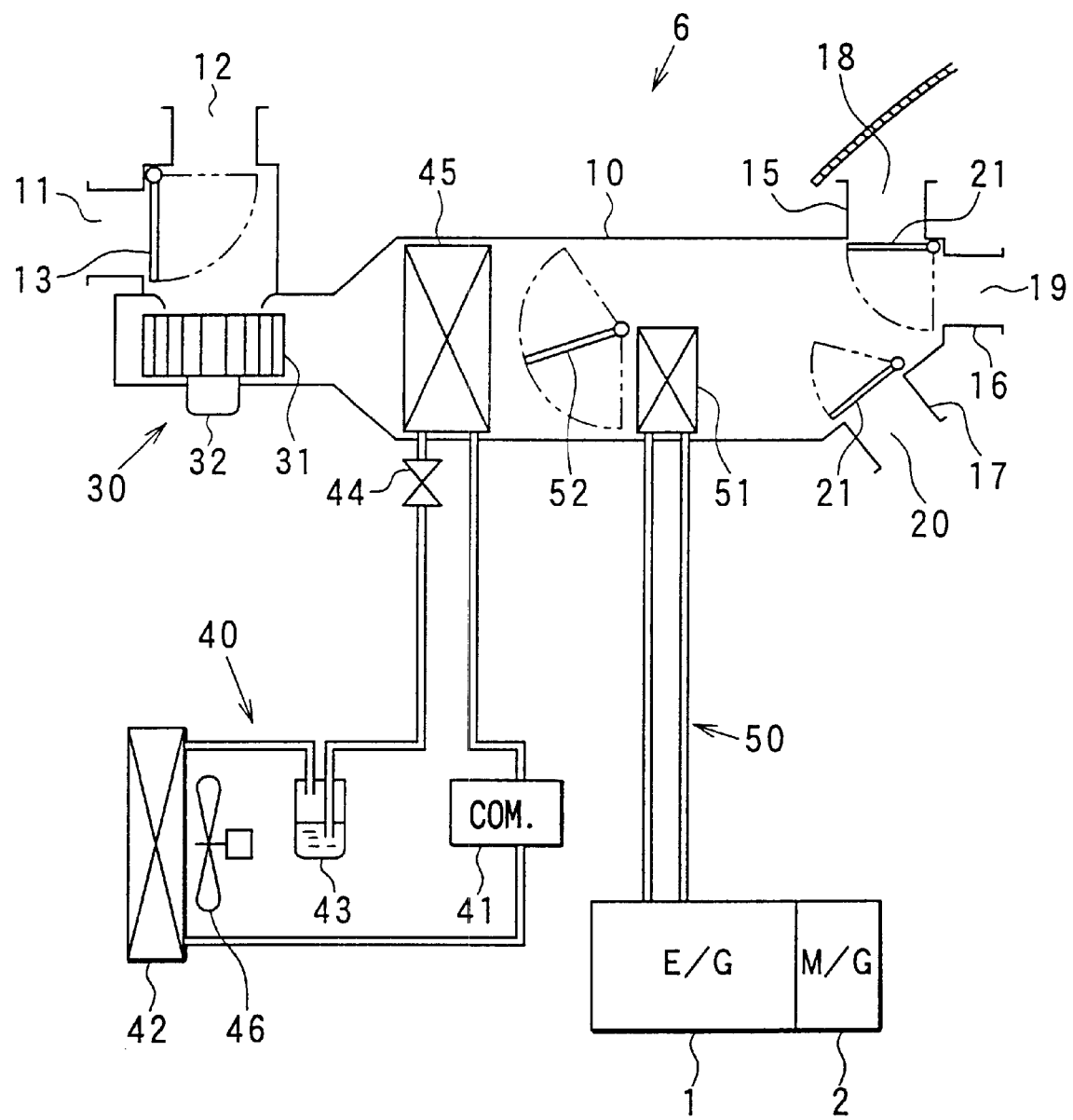
FIG. 2 is a schematic diagram showing an entire structure of the air conditioner according to the first embodiment.

As shown in FIG. 2, the air conditioning unit 6, disposed in the passenger compartment at a front side, includes an air-conditioning duct 10 defining an air passage through which air is introduced into the passenger compartment, a centrifugal type blower 30 for blowing air in the air-conditioning duct 10, a refrigerant cycle system 40, a cooling water circuit 50 and the like. The refrigerant cycle system 40 is disposed to cool air flowing through the air-conditioning duct 10. An inside/outside air switching box, disposed at the most upstream air side of the air-conditioning duct 10, includes an inside air suction port 11 from which inside air inside the passenger compartment is introduced, and an outside air suction port 12 from which outside air outside the passenger compartment is introduced. These suction ports 11, 12 are opened and closed by an inside/outside air switching damper 13, and the inside/outside air switching damper 13 is driven by an actuator 14 such as a servomotor. At the most downstream air side of the air-conditioning duct 10, a defroster opening portion, a face opening portion and a foot opening portion are provided.

A defroster duct 15 is connected to the defroster opening portion, and a defroster air outlet port 18, through which conditioned air is blown toward an inner surface of a vehicle windshield, is provided at the most downstream air end of the defroster duct 15. A face duct 16 is connected to the face opening portion, and a face air outlet port 19, through which conditioned air is blown toward the upper half body of a passenger, is provided at the most downstream air end of the face duct 16. A foot duct 17 is connected to the foot opening portion, and a foot air outlet port 20, through which conditioned air is blown to the foot portion of the passenger, is provided at the most downstream air end of the foot duct 17. Two switching dampers 21, driven by actuators 22, respectively, are rotatably provided for the air outlet ports 18–20. Thus, the switching dampers 21 can switch one air outlet mode among a face mode, a bi-level mode, a foot mode, a foot/defroster mode and a defroster mode.

The blower 30 includes a centrifugal fan 31, rotatably disposed in a scroll case integrated with the air-conditioning duct 10, and a blower motor 32 for driving the centrifugal fan 31. A blown air amount (rotation speed of the centrifugal fan 31) is controlled in accordance with a blower voltage applied to the blower motor 32 through a blower driving circuit 33.

The refrigerant cycle system 40 includes an electrical compressor 41, a condenser 42, a gas-liquid separator 43, an expansion valve 44, an evaporator 45, a cooling fan 46 for blowing outside air to the condenser 42, refrigerant piping for connecting these, and the like. The electrical compressor 41 includes a motor for driving a compression mechanism using an electrical power from the battery 4. The condenser 42 is disposed to condense and liquify refrigerant by performing a heat exchange between compressed refrigerant and outside air. The gas-liquid separator 43 is disposed to separate the condensed refrigerant from the condenser 42 into gas refrigerant and liquid refrigerant, so that only the liquid refrigerant flow to a downstream refrigerant side. The expansion valve 44 decompresses and expands the liquid refrigerant from the gas-liquid separator 43, and the evaporator 45 is disposed to perform a heat exchange between the decompressed refrigerant from the expansion valve 44 and air passing through the air-conditioning duct 10. An alternating-current (AC) voltage is applied to the motor of the electrical compressor 41 through an inverter 47, and the inverter 47 adjusts a frequency of the AC voltage based on an instruction from the air-conditioning controller 7. Thus, a rotation speed of the electrical compressor 41 can be continuously changed.

A heater core 51 is disposed in the cooling water circuit 50 in which engine-cooling water (hot water) of the engine 1 is circulated by a water pump (not shown). The heater core 51 performs an heat exchange between the engine-cooling water and air so that air passing through the heater core 51 is heated. The heater core 51 is disposed in the air-conditioning duct 10 at a downstream air side of the evaporator 45 so as to partly cross the air passage in the air-conditioning duct 10. An air mixing damper 52, driven by an actuator 53 such as a servomotor, is rotatably disposed at an upstream air side of the heater core 51. The air mixing damper 52 adjusts a ratio of an air amount passing through the heater core 51 and an air amount bypassing the heater core 51, so as to adjust a temperature of air to be blown into the passenger compartment.

Next, a control system of the first embodiment will be described with reference to FIGS. 1, 3 and 4. Into the air-conditioning controller 7, communication signals from the vehicle controller 5, switch signals from plural switches provided on a control panel 60 in the passenger compartment, and sensor signals from plural sensors are input.

As shown in FIG. 44, the plural switches provided on the control panel 60 includes an air-conditioning switch 61a, a full switch 61b, a suction-port changing over switch 62, a temperature setting lever 63, an air amount changing over switch 64, an air-outlet mode changing over switch and the like. The air-conditioning switch 61a is disposed to start and stop an operation of the refrigerant cycle system 40 (electrical compressor 41). The full switch 61b selects any one of a full mode where an air-conditioning control is performed while an amenity in the passenger compartment is mainly improved, and an economy mode where the air-conditioning control is performed while fuel-economical property (fuel consumption efficiency) is mainly improved. The suction-port changing over switch 62 switches an air suction mode, and the temperature setting lever 63 sets a temperature in the passenger compartment at a requested temperature. The air-amount changing over switch 64 switches an amount of air blown by the centrifugal fan 31, and the air-outlet mode changing over switch switches an air outlet mode. The air-outlet mode changing over switch include a face switch 65 for setting a face mode, a bi-level switch 66 for setting a bi-level mode, a foot switch 67 for setting a foot mode, a foot/defroster switch 68 for setting a foot/defroster mode and a defroster switch 69 for setting a defroster mode.

Figure 3:
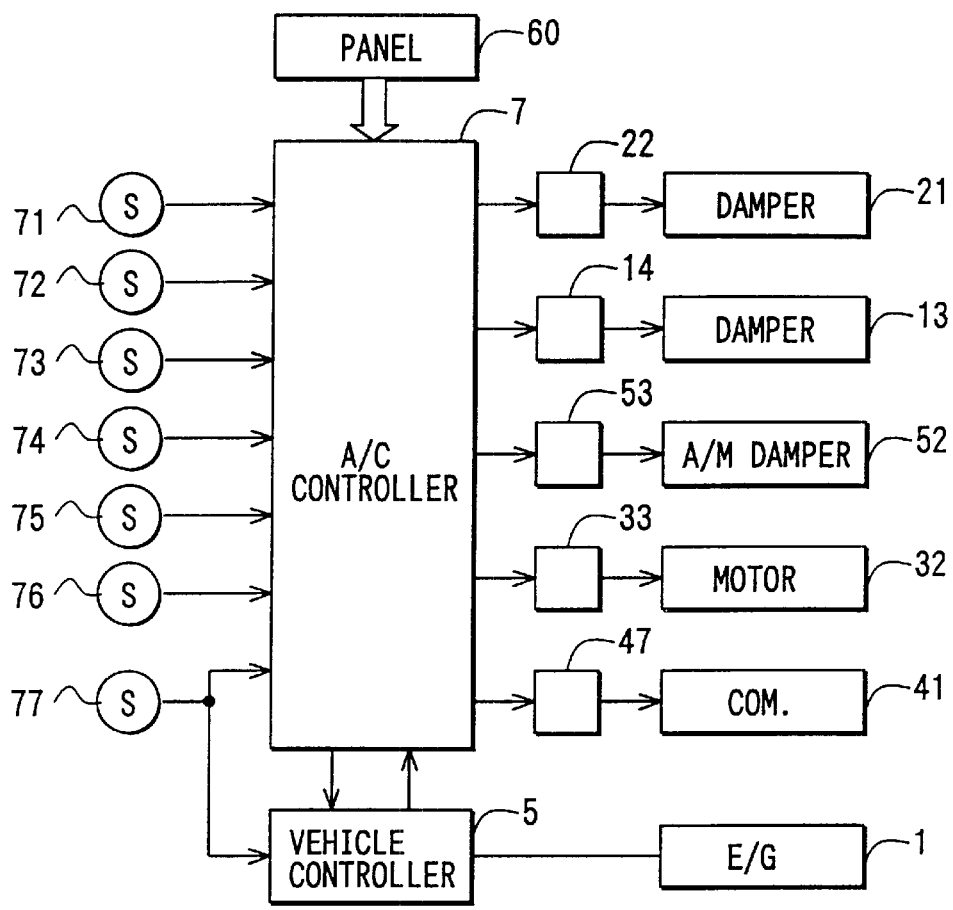
FIG. 3 is a block diagram showing a control unit of the air conditioner according to the first embodiment.
Figure 4:
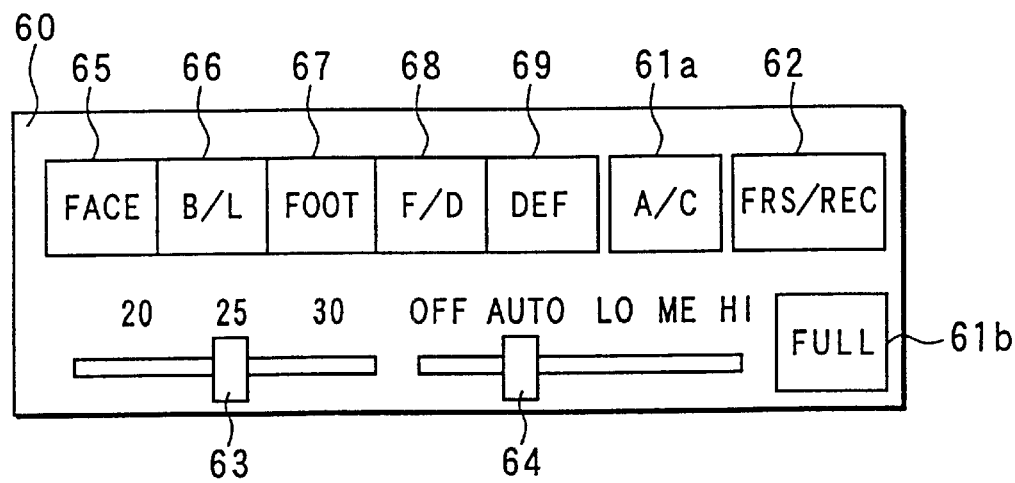
FIG. 4 is a plan view showing a control panel shown in FIG. 3.

As shown in FIG. 3, the plural sensors include an inside air temperature sensor 71, an outside air temperature sensor 72, a solar radiation sensor 73, an evaporator air Suction temperature sensor 74, an evaporator air blow temperature sensor 75, a water temperature sensor 76, a speed sensor 77 and the like. The inside air temperature sensor 71 detects an air temperature in the passenger compartment, and the outside air temperature sensor 72 detects an air temperature outside the passenger compartment. The solar radiation sensor 73 detects an amount of sunlight radiated into the passenger compartment. The evaporator suction air temperature sensor 74 detects a temperature (evaporator suction temperature) TIN of air flowing into the evaporator 45, and the evaporator air blow temperature sensor 75 detects a temperature of air immediately after flowing through the evaporator 45. The water temperature sensor 76 detects a temperature of cooling water flowing into the heater core 51, and the speed sensor 77 detects a vehicle speed. Thermistors can be used as the inside air temperature sensor 71, the outside air temperature sensor 72, the evaporator suction air temperature sensor 74, the evaporator air blow temperature sensor 75 and the water temperature sensor 76, among the above sensors.

The air-conditioning controller 7 includes a microcomputer (not shown) composed of a central processing unit (CPU), a read only memory (ROM), a random access memory (RAM) and the like. Sensor signals from the sensors 71–77 are converted from analog signals to digital signals by an input circuit (not shown) within the air-conditioning controller 7. Thereafter, the digital signals are inputted into the microcomputer.

Figure 5:
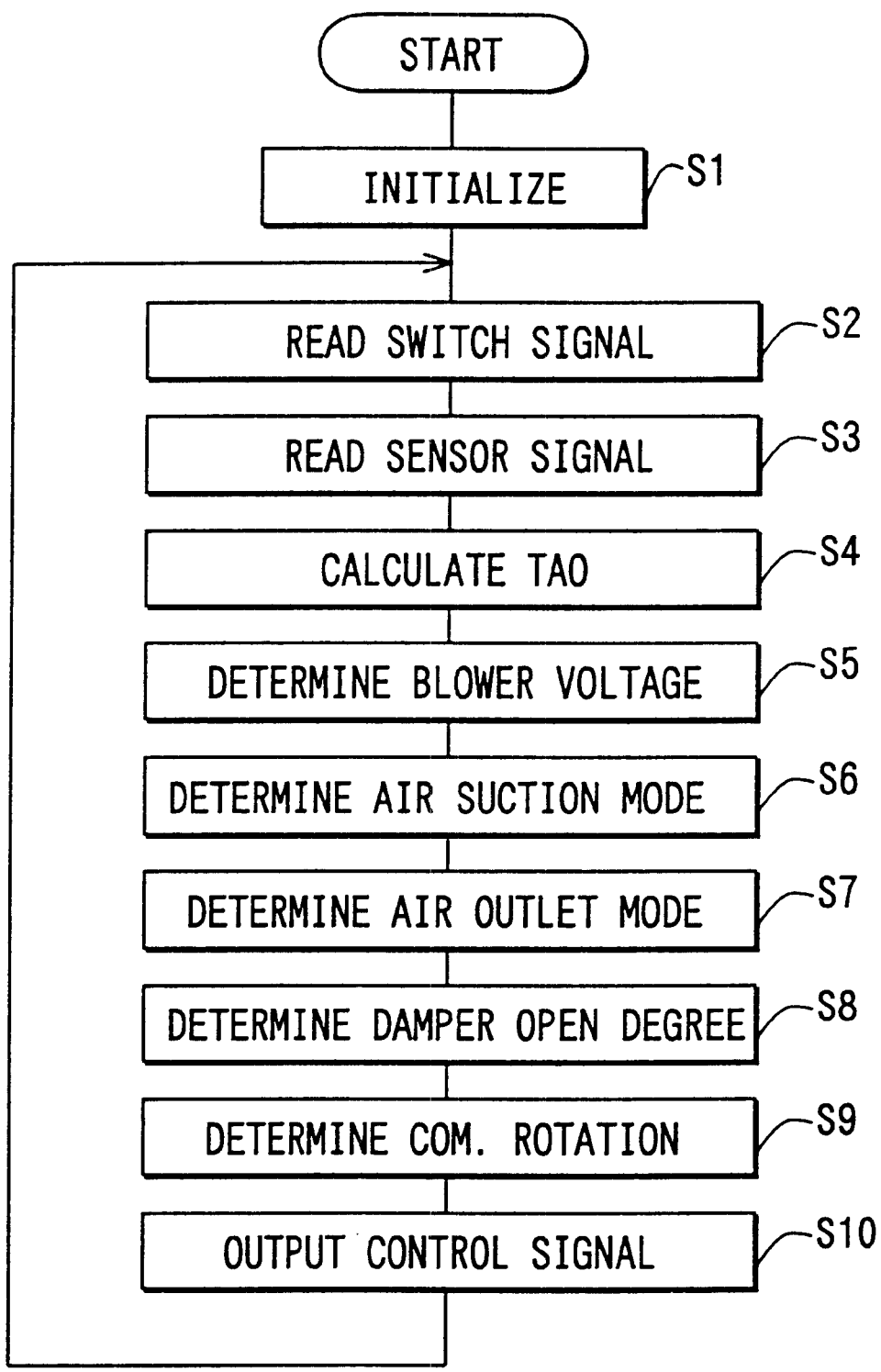
FIG. 5 is a flow diagram showing basic control processes of the air conditioning controller (A/C controller) shown in FIG. 1.
Figure 6:
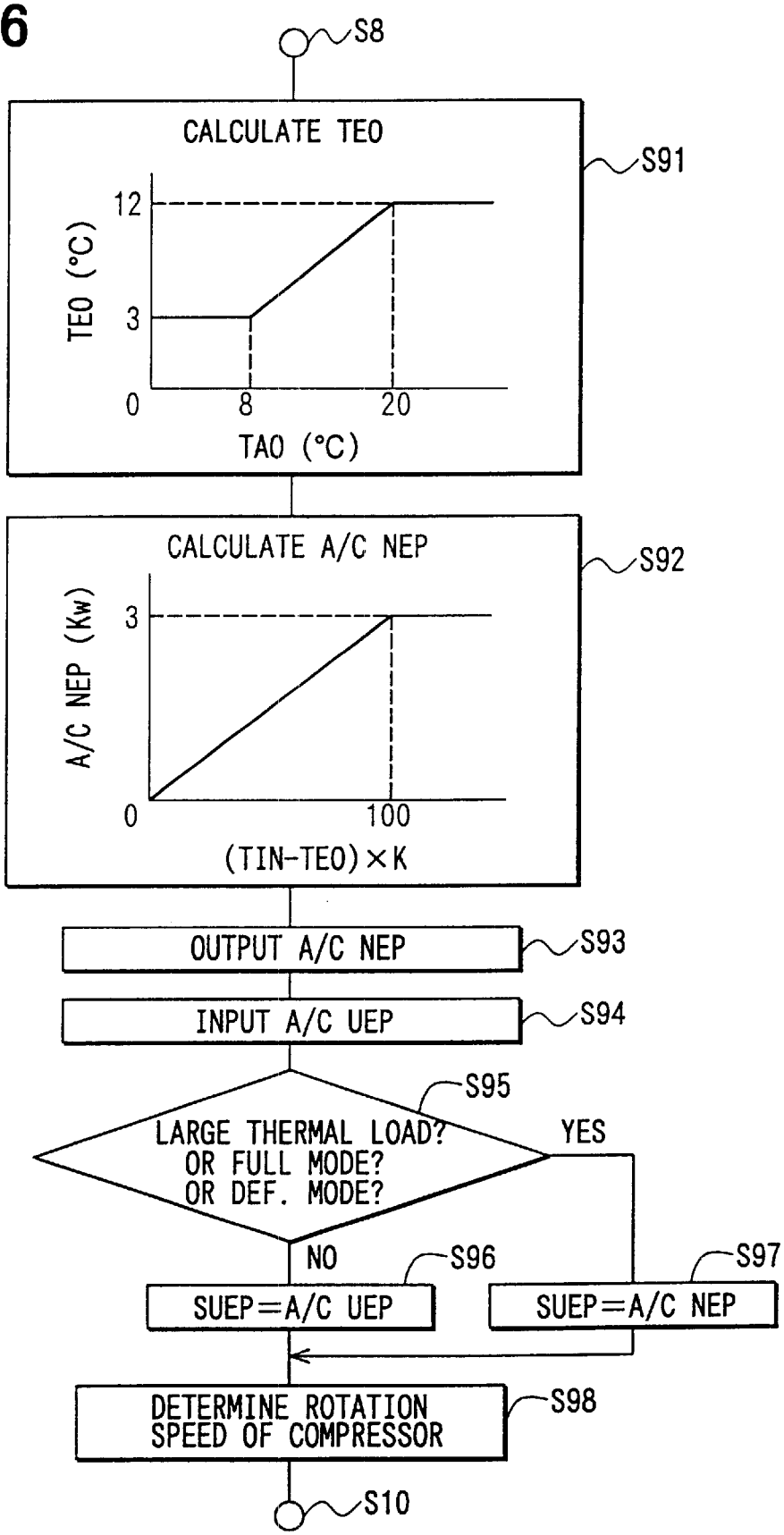
FIG. 6 is a flow diagram showing a detail control at step S9 in FIG. 5, according to the first embodiment.

Next, control processes of the air-conditioning controller 7 will be described with reference to FIGS. 5 and 6. When the ignition switch is turned on, a direct-current electrical power is applied to the air-conditioning controller 7, and a control routine shown in FIG. 5 is started. First, initial setting is performed at step S1. Next, at step S2, the air-conditioning controller 7 reads the switch signals from the switches such as the temperature setting lever 63. At step S3, the air-conditioning controller 7 reads the sensor signals, from the inside air temperature sensor 71, the outside air temperature sensor 72, the solar radiation sensor 73, the evaporator air suction temperature sensor 74, the evaporator air blow temperature sensor 75, the water temperature sensor 76 and the speed sensor 77, converted from analog signals to digital signals.

At step S4, a target temperature TAO of air to be blown into the passenger compartment is calculated based on the following formula (1) beforehand stored in the ROM.

$$TAO = Kset \times Tset - KR \times TR - KAM \times TAM - KS \times TS + C \quad (1)$$

Wherein, Tset indicates a temperature set by the temperature setting lever 63, TR indicates an inside air temperature detected by the inside air temperature sensor 71, TAM indicates an outside air temperature detected by the outside air temperature sensor 72, and TS indicates a solar radiation amount detected by the solar radiation sensor 73. Kset, KR, KAM and KS indicate gain coefficients, respectively, and C indicates a correction constant.

At step S5, a blower voltage (applied to the blower motor 32) corresponding to the target air temperature TAO is determined using a characteristic view beforehand stored in the ROM. Specifically, as the target air temperature TAO becomes lower than the set temperature or higher than that, the blower voltage is made higher (air amount is increased). On the other hand, as the target air temperature TAO becomes close to the set temperature, the blower voltage is made lower.

Next, at step S6, an air suction mode corresponding to the target air temperature TAO is determined using the characteristic view beforehand stored in the ROM. Specifically, when the target air temperature TAO is low, an inside air circulation mode is selected. When the target air temperature TAO is high, an outside air introduction mode is selected. At step S7, an air outlet mode corresponding to the target air temperature TAO is determined using the characteristic view beforehand stored in the ROM. Specifically, when the target air temperature TAO is low, the foot mode is selected. As the target air temperature TAO becomes higher, the air outlet mode is selected from the foot mode to the face mode through the bi-level mode.

At step S8, an open degree of the air mixing damper 52 is determined in accordance with the target air temperature TAO, the evaporator air temperature detected by the evaporator air blow temperature sensor 75, the cooling water temperature detected by the water temperature sensor 76 and the like. At step S9, a sub-routine shown in FIG. 6 is called, and the rotation speed of the electrical compressor 41 is determined when the air-conditioning switch 61a is turned on. At step S10, control signals are outputted to the actuators 14, 22, 53, the blower circuit 33 and the inverter 47 so as to obtain each of control states calculated or determined at steps S4–S9.

Next, detail control of the rotation speed of the electrical compressor 41 will be now described with reference to FIG. 6. At step S91, a target evaporator air temperature TEO blown from the evaporator 45, corresponding to the target air temperature TAO, is calculated. At this step, when the full mode is selected by the full switch 61b, the target evaporator air temperature TEO is determined based on a characteristic view shown at step S91. On the other hand, when the economy mode is selected by the full switch 61b, the target evaporator air temperature TEO is set higher than that in the full mode.

At step S92, an air-conditioning necessary electrical power (A/C NEP), originally required in the air-conditioning unit 6 for reducing the evaporator suction air temperature TIN to the target evaporator air temperature TEO, is calculated using a constant K. The constant K is determined by the target evaporator air temperature TEO, the evaporator suction air temperature TIN and the air amount blown from the blower 30. Here, as the rotation speed of the electrical compressor 41 becomes higher, cooling performance of the refrigerant cycle system 40 is improved. Therefore, as a temperature difference between the evaporator suction air temperature TIN and the target evaporator air temperature TEO increases, the air-conditioning necessary electrical power NEP is increased.

At step S93, the air-conditioning necessary electrical power NEP calculated at step S92 is output to the vehicle controller 5. Next, at step S94, an air-conditioning usable electrical power (A/C UEP, described later in detail) calculated by the vehicle controller 5 is inputted to the air-conditioning controller 7.

At step S95, it is determined whether an air-conditioning heat load (thermal load) is large, or it is determined whether the full mode is selected, or it is determined whether the defroster mode is selected. The air-conditioning heat load becomes large, at a time immediately after starting a heating operation or a cooling operation (warming up time or cooling down time), or at a time where an outside air temperature is high while the outside air introduction mode is selected.

At step S95, when the air-conditioning heat load is determined to be high, or when the full mode is determined to be selected, or when the defroster mode is determined to be selected, the determination result is "YES". In this case, the control process proceeds to step S97, and a set usable electrical power SUEP is set at the air-conditioning necessary electrical power (A/C NEP). The set usable electrical power SUEP is a control value of electrical power usable for the air conditioning unit 6. That is, in this case, the air-conditioning capacity of the air conditioning unit 6 is not reduced. Next, at step S98, the rotation speed of the electrical compressor 41 is determined based on the set usable electrical power SUEP. At step S95, when the air-conditioning heat load is not determined to be high, when the full mode is not selected, and when the defroster mode is not selected, the determination result is "NO". In this case, the control process proceeds to step S96, and the set usable electrical power SUEP is set at the air-conditioning usable electrical power (A/C UEP). Thereafter, at step S98, the rotation speed of the electrical compressor 41 is determined based on the set usable electrical power SUEP. In the first embodiment, generally, the usable electrical power UEP for the air-conditioning unit 6 is set to be equal to or smaller than the necessary electrical power NEP. Therefore, the air-conditioning capacity of the air conditioning unit 6 is reduced at step S96.

Next, the control processes related to the air-conditioning control, in the vehicle controller 5, will be now described with reference to FIG. 7. Within the vehicle controller 5, a microcomputer (not shown) composed of a CPU, a ROM, a RAM and the like is provided. A sensor signal from the speed sensor 77 is converted from an analog signal to a digital signal by an input circuit (not shown) within the vehicle controller 5. Thereafter, the digital signal is inputted into the microcomputer of the vehicle controller 5.

Figure 7:
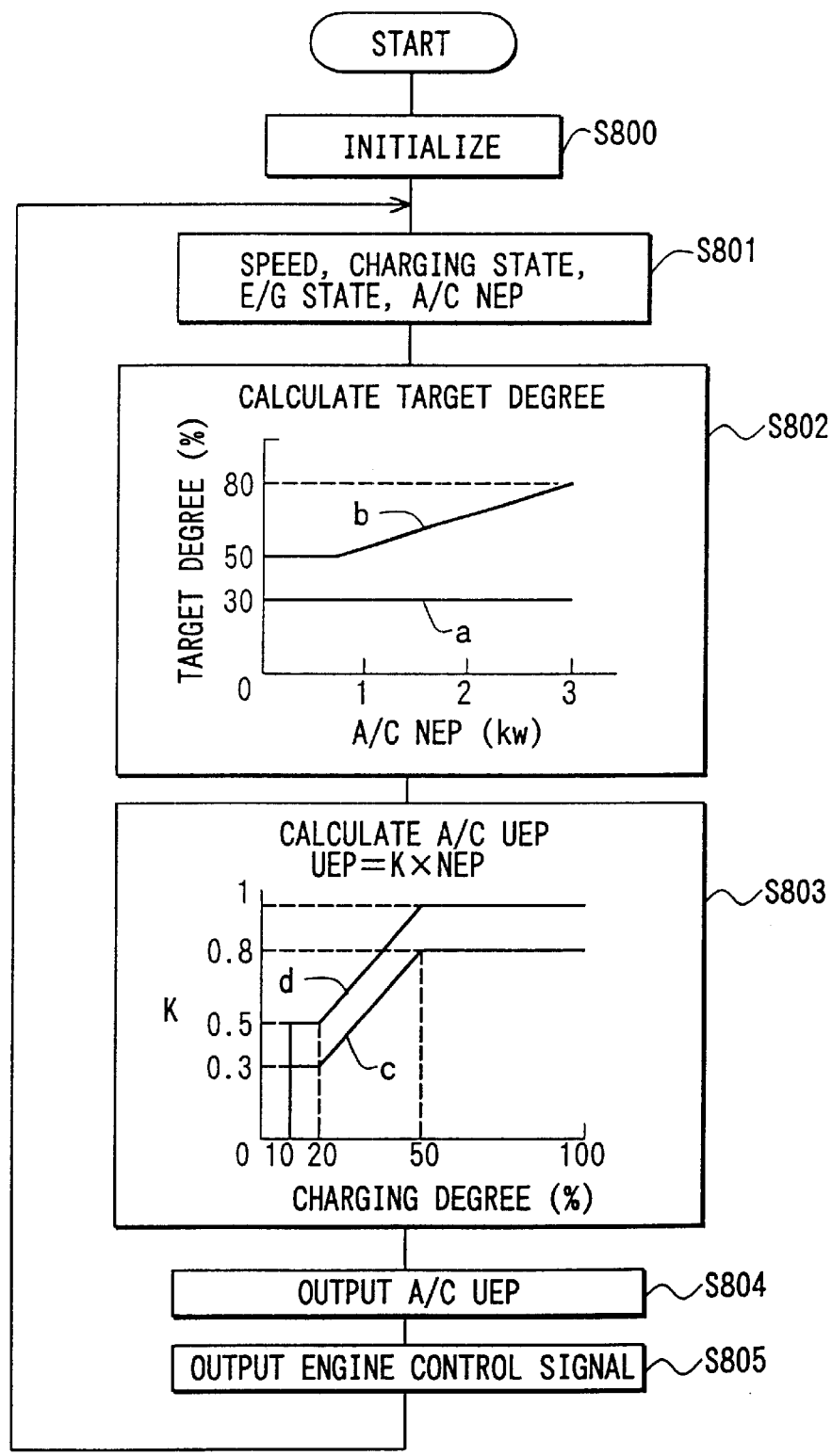
FIG. 7 is a flow diagram showing control processes related to air-conditioning control in a vehicle controller shown in FIG. 1.

When the ignition switch is turned on, direct-current electrical power is supplied to the vehicle controller 5, a control routine shown in FIG. 7 is started, and initial setting is performed at step S800. At step S801, the vehicle speed is calculated based on the signal from the speed sensor 77, and a charging state (e.g., residual charging degree) of the battery 4 is calculated based on a voltage of the battery 4. Further, the rotation speed of the engine 1 is inputted to the vehicle controller 5 to determine the operation state of the engine 1 (e.g., whether the engine 1 is driven or not), and the air-conditioning necessary electrical power A/C NEP calculated by the air-conditioning controller 7 is inputted to the vehicle controller 5.

At step S802, the target degree (target value for starting the charging) is calculated based on the air-conditioning necessary electrical power (A/C NEP) and the operation state of the engine 1. When the engine 1 is stopped, the target degree is set at 30% as indicated by the line "a" shown in FIG. 7. When the engine 1 is operated, the charging target value gradually becomes higher from 50% to 80% as the air-conditioning necessary electrical power NEP increases, as indicated by the line "b" shown in FIG. 7. When the charging state (residual charging degree) becomes equal to or lower than the target degree, the electrical motor generator 2 is driven by the engine 1 so as to generate electrical power, and the battery 4 is charged by the electrical motor generator 2.

At this time, in a vehicle where an additional power generator is provided separately from the electrical motor generator 2 and is driven by the engine 1 through a clutch (motive-power interrupting device), when the residual charging degree becomes equal to or lower than the target degree, the clutch is made to be in a motive-power transmission state, and the additional power generator generates electrical power so that the battery 4 is charged by the additional power generator. Alternatively, even when the electrical motor generator 2 is not used for running the vehicle, the electrical motor generator 2 may be used for generating electrical power.

When the vehicle speed is low, the engine 1 is generally stopped. However, while the charging state does not reach the target degree, the charging operation is continued without stopping the engine 1 even when the vehicle speed is low.

At step S803, the constant K is calculated based on the charging state of the battery 4 and the operation state of the engine 1, and air-conditioning usable electrical power A/C UEP is calculated by multiplying the air-conditioning necessary electrical power NEP by the constant K. While the engine 1 is operated, the constant K is changed as indicated by the line "d" shown in FIG. 7. That is, when the residual charging degree is equal to or lower than 10%, the constant K is zero. When the residual charging degree is in a range between 10% and 20%, the constant K is 0.5. When the residual charging degree is in a range between 20% and 50%, the constant K gradually increases as the residual charging degree increases. When the residual charging degree is equal to or larger than 50%, the constant K is set at 1. On the other hand, while, the engine 1 is stopped, the constant K is changed as indicated by the line "c" shown in FIG. 7. That is, when the residual charging degree is equal to or larger than 10%, the constant K is set smaller by 0.2 than that when the engine 1 is operated. At step S804, the air-conditioning usable electrical power UEP calculated at step S803 is output to the air-conditioning controller 7. At step S805, a control signal is output to the engine controller 3 so that the charging degree becomes higher than the target degree calculated at step S802.

Next, operation of the air conditioner will be now described. While air blown by the blower 30 in the air duct 10 flows through the evaporator 45 in the refrigerant cycle system 40, air is heat-exchanged with refrigerant and is cooled. Here, the rotation speed of the electrical compressor 41 is controlled by the air-conditioning controller 7, so that an amount of refrigerant, flowing in the refrigerant cycle system 40, is controlled and the cooling performance of the refrigerant cycle system 40 is adjusted.

When air cooled in the evaporator 45 flows through the heater core 51 in the cooling water circuit 50, air is heat-exchanged with engine-cooling water and is heated. In addition, the ratio of air flowing through the heater core 51 and air bypassing the heater core 51 is adjusted by an operation position of the air mixing damper 52. Thus, the conditioned air adjusted at a predetermined temperature is blown from one or two of the air outlet ports 18–20 into the passenger compartment.

According to the first embodiment, the air-conditioning necessary electrical power NEP, which is required in the air conditioning unit 6 for adjusting the temperature in the passenger compartment at a set temperature, is calculated. While the engine 1 is operated, the target degree of the battery 4 is set higher as the air-conditioning necessary electrical power NEP increases at step S802.

Since the target degree of the battery 4 is set higher only while the engine is operated, the charging operation tends to be required while the engine 1 is operated. Therefore, the engine 1 is difficult to be started only for the charging operation. Because the engine thermal efficiency generally becomes higher as an engine load increases, the engine thermal efficiency becomes higher when the engine is driven for running the vehicle and for charging the battery 4, as compared with a case where the engine is driven only for charging the battery 4. Accordingly, the engine 1 can be operated in a state with high engine-thermal efficiency, thereby improving fuel consumption performance and reducing an exhaust amount of environmental polluting matter. Further, an amount of electrical power, consumed by a starter motor for starting the engine 1, can be also reduced, thereby further improving fuel consumption efficiency and reducing the exhaust amount of environmental polluting matter.

Further, at step S803, the air-conditioning usable electrical power UEP is set lower as the residual charging degree is reduced. When the determination result is "NO" at step S95 in FIG. 6, the air-conditioning usable electrical power UEP is used as the set usable electrical power SUEP at step S96. Accordingly, the electrical power used for the air conditioning unit 6 is restricted equal to or lower than the air-conditioning necessary electrical power NEP. That is, in this case, capacity of the air conditioning unit 6 is set lower. Therefore, when the residual charging degree of the battery 4 is low, electrical load applied to the battery 4 can be reduced, and a time of stopping the engine 1 can be lengthened. Thus, a starting frequency of the engine 1, only for charging the battery 1, is reduced, thereby reducing fuel consumption and an exhaust amount of environmental polluting matter. On the other hand, at step S803, when the charging degree of the battery 4 is high, the air-conditioning usable electrical power UEP is set higher, thereby ensuring an amenity and a safety (visibility) in the passenger compartment.

At steps S803, S96, while the engine 1 is stopped, the electrical power used for the air conditioning unit 6 is restricted equal to or lower than the air-conditioning necessary electrical power NEP, thereby reducing electrical load applied to the battery 4 while the engine 1 is stopped. Therefore, in this case, a time for which the engine 1 stops can be made longer. In addition, while the engine 1 is stopped, the target degree of the battery 4 is set lower than that when the engine 1 is operated, thereby lengthening the time for which the engine 1 stops continuously. Accordingly, the frequency for starting the engine 1 only for charging the battery 4 is reduced, thereby improving fuel consumption efficiency and reducing the exhaust amount of environmental polluting matter.

In addition, at step S95, when the air-conditioning heat load is large, or when the full mode is selected or when the defroster mode is selected, the air-conditioning necessary electrical power NEP is used as the set usable electrical power SUEP at step S97. That is, in this case, the capacity of the air conditioning unit 6 is forbidden from being set lower, thereby ensuring the amenity and the safety (visibility) in the passenger compartment.

Here, since the electrical compressor 41 is driven using the electrical power from the battery 4, the engine 1 is not necessarily required to be driven while the electrical compressor 41 is driven. Therefore, the engine 1 can be freely driven or stopped irrespective of the operation state of the electrical compressor 41, and the above effects can be further obtained.

A second embodiment will be described with reference to FIG. 8. In the second embodiment, a part of the control processes (refer to FIG. 7), related to the air-conditioning control in the vehicle controller 5 of the first embodiment, is changed. However, the other parts are similar to those of the above-described first embodiment. The present invention according to the second embodiment is also applied to the hybrid vehicle. In the hybrid vehicle, the engine 1 is stopped while the vehicle is stopped, and the engine 1 is controlled to be driven and stopped according to a running condition (mainly, vehicle speed and running load) while the vehicle runs.

Figure 8:
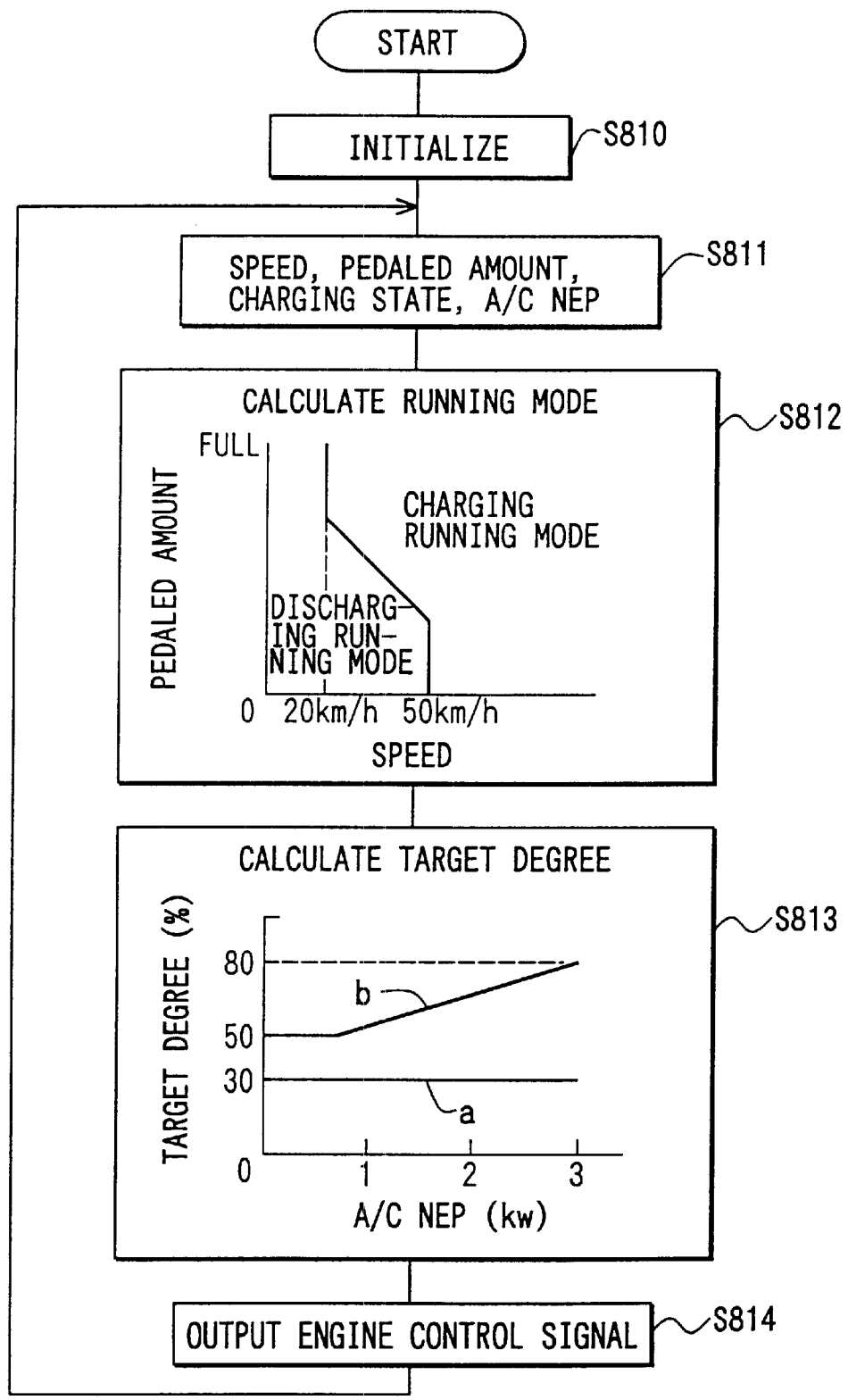
FIG. 8 is a flow diagram showing control processes of an air conditioner according to a second embodiment of the present invention.

As shown in FIG. 8, at step S810, the initial setting is performed. Thereafter, at step S811, the vehicle speed, the charging state of the battery 4 and the pedaled amount of an accelerator pedal are calculated, and the air-conditioning necessary electrical power NEP of the air conditioning unit 6 is inputted to the air-conditioning controller 7. At step S812, it is determined whether the vehicle is in a charging running mode or in a discharging running mode. The charging running mode is a running mode where the possibility of driving the engine 1 is high. That is, in the charging running mode, the vehicle runs stably, or at a high speed or in a high load state. On the other hand, the discharging running mode is a running mode where the possibility of driving the engine 1 is low. That is, in the discharging running mode, the vehicle starts, the vehicle runs at a low speed or in a low load state. Although the engine 1 is stopped when the vehicle speed is reduced (vehicle is braked), the battery 4 is charged using this speed reduction force. Therefore, this case is omitted from the discharging running mode.

At step S813, the charging target value is calculated based on the calculation result at step S812 and the air-conditioning necessary electrical power NEP. In the discharging running mode, as indicated by the line "a" at step S813 in FIG. 8, the target degree is set at 30% irrespective of the air-conditioning necessary electrical power NEP. In the charging running mode, as indicated by the line "b" at step S813 in FIG. 8, the target degree is gradually increased from 50% to 80% as the air-conditioning necessary electrical power NEP increases. When the residual charging degree of the battery 4 becomes equal to or lower than the target degree, the electrical motor generator 2 is driven by the engine 1 so as to generate electrical power, so that the battery 4 is charged by the electrical motor generator 2. Next, at step S814, a control signal is output to the engine controller 3 so that the residual charging degree of the battery 4 becomes larger than the target degree calculated at step S813.

In the second embodiment, the target degree of the battery 4 is set higher only in the charging running mode where the probability of driving the engine 1 is high. Accordingly, the frequency for starting the engine 1 only for charging the battery 1 is reduced, thereby improving the fuel consumption efficiency and reducing the exhaust amount of environmental polluting matter. In the second embodiment, the running mode is divided based on the vehicle speed and the pedaled amount of the accelerator pedal. However, for example, the running mode can be divided only based on the vehicle speed, so that the charging running mode can be defined in a high speed region and the discharging running mode can be defined in a low speed region.

A third embodiment of the present invention will be described with reference to FIG. 9. In the third embodiment, a part of the control processes (refer to FIG. 7), related to the air-conditioning control of the vehicle controller 5 in the first embodiment, is changed, but the other part thereof is not changed. The present invention according to the third embodiment is also applied to the hybrid vehicle.

Figure 9:
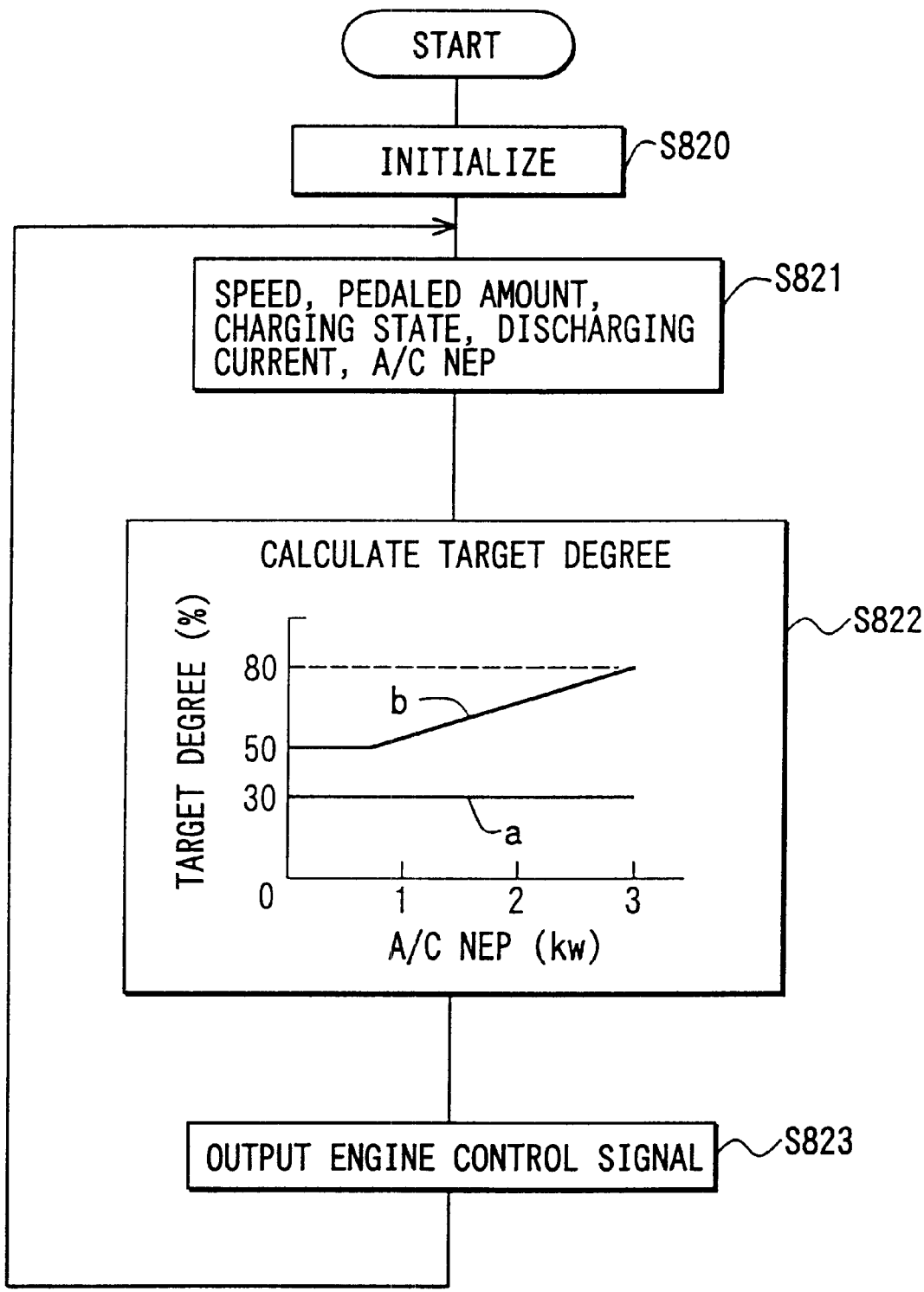
FIG. 9 is a flow diagram showing control processes of an air conditioner according to a third embodiment of the present invention.

AS shown in FIG. 9, at step S820, the initial setting is performed. Thereafter, at step S821, the vehicle speed, the residual charging degree of the battery 4, a discharging current from the battery 4, and the pedaled amount of the accelerator pedal are input, and the air-conditioning necessary electrical power NEP of the air conditioning unit 6 is inputted. At step S822, the target degree of the battery 4 is calculated based on the air-conditioning necessary electrical power NEP and the discharging current of the battery 4. When the discharging current is large, the target degree is set at 30%, as indicated by the line "a" shown in FIG. 9, irrespective of the air-conditioning necessary electrical power NEP. When the discharging current is small, the target degree is gradually increased from 50% to 80%, as indicated by the line "b", as the air-conditioning necessary electrical power NEP increases. When the residual charging degree of the battery 4 becomes equal to or lower than the target degree, the electrical motor generator 2 is driven by the engine 1 to generate electrical power, so that the battery 4 is charged by the electrical motor generator 2.

Next, at step S823, a control signal is output to the engine controller 3 so that the residual charging degree of the battery 4 becomes equal to or larger than the target degree calculated at step S822. Here, when the discharging current of the battery 4 is large, it can be estimated that a charging operation is not performed and the possibility for driving the engine 1 is low. Accordingly, when the discharging current is large, the target degree of the battery 4 is set lower, so that the frequency of requiring the charging operation of the battery 4 is reduced when the discharging current of the battery 4 is large. Accordingly, the frequency of starting the engine 1 only for charging the battery 1 is reduced, thereby improving fuel consumption efficiency and reducing an exhaust amount of environmental polluting matter.

A fourth embodiment of the present invention will be now described with reference to FIG. 10. In the fourth embodiment, a part of the control processes (refer to FIG. 7), related to the air-conditioning control of the vehicle controller 5 in the first embodiment, is changed, but the other part thereof is, not changed. The present invention according to the third embodiment is also applied to the hybrid vehicle.

Figure 10:
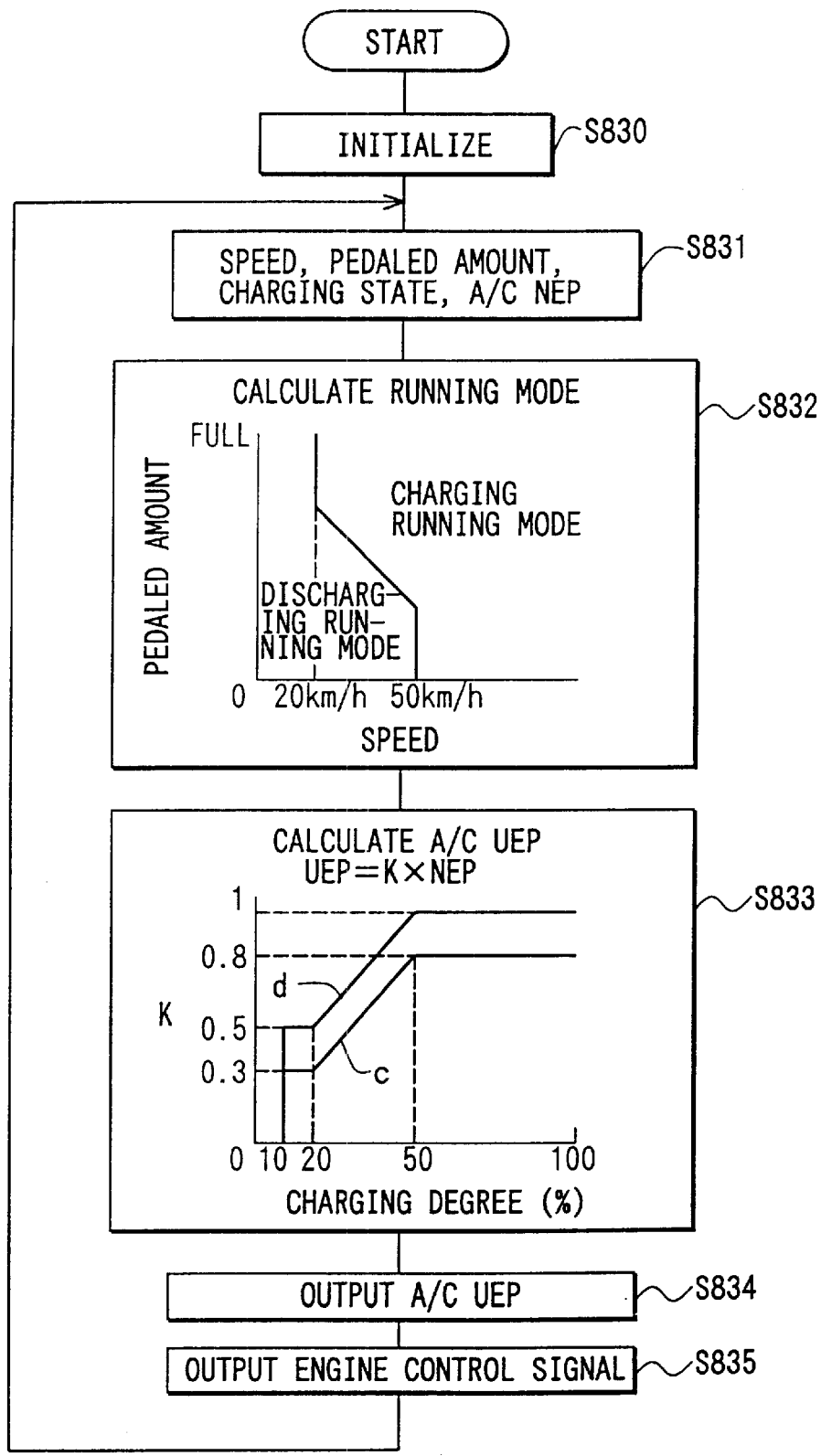
FIG. 10 is a flow diagram showing control processes of an air conditioner according to a fourth embodiment of the present invention.

As shown in FIG. 10, at step S830, the initial setting is performed. Thereafter, at step S831, the vehicle speed, the residual charging degree of the battery 4 and the pedaled amount of the accelerator pedal are calculated, and the air-conditioning necessary electrical power NEP of the air conditioning unit 6 is inputted. At step S832, it is determined based on the vehicle speed and the pedaled amount of the accelerator pedal whether the vehicle is in the charging running mode or in the discharging running mode.

At step S833, the constant K is obtained based on the residual charging degree and the running mode, and air-conditioning usable electrical power UEP is calculated by multiplying the air-conditioning necessary electrical power NEP by the constant K. In the charging running mode, the constant K is changed as indicated by the line "d" in the graph at step S833 in FIG. 10. That is, when the residual charging degree (changing state) is equal to or lower than 10%, the constant K is zero. When the residual charging degree is between 10% and 20%, the constant K is 0.5. When the residual charging degree is in a range between 20% and 50%, the constant K gradually increases as the residual charging degree increases. When the residual charging degree is equal to or larger than 50%, the constant K is set at 1. In the discharging running mode, the constant K is changed as indicated by the line "c" in the graph at step S833 in FIG. 10. That is, when the residual charging degree is equal to or higher than 10%, the constant K is smaller by 0.2 than that in the charging running mode. Next, at step S834, the air-conditioning usable electrical power UEP calculated at step S833 is output to the air-conditioning controller 7. At step S835, a control signal is output to the engine controller 3 so that the residual charging degree-becomes equal to or larger than the target degree.

In the fourth embodiment, since the electrical power used for the air conditioning unit 6 (air-conditioning capacity) is restricted equal to or lower than the air-conditioning necessary electrical power NEP, electrical load applied to the battery 4 is reduced, and the frequency for starting the engine 1 only for charging the battery 1 is reduced. Accordingly, fuel consumption efficiency can be improved, and an exhaust amount of environmental polluting matter can be reduced. In the fourth embodiment, the running mode is divided based on the vehicle speed and the pedaled amount of the accelerator pedal. However, for example, the running mode may be divided only based on the vehicle speed.

A fifth embodiment of the present invention will be described with reference to FIGS. 11 and 12. In the fifth embodiment, a part of control processes (refer to FIG. 6) of the air conditioning controller 7 and a part of the control processes (refer to FIG. 7), related to the air-conditioning control in the vehicle controller 5 of the first embodiment, are changed. However, in the fifth embodiment, the other parts are similar to those of the above-described first embodiment. The present invention according to the fifth embodiment is also applied to the hybrid vehicle.

Figure 11:
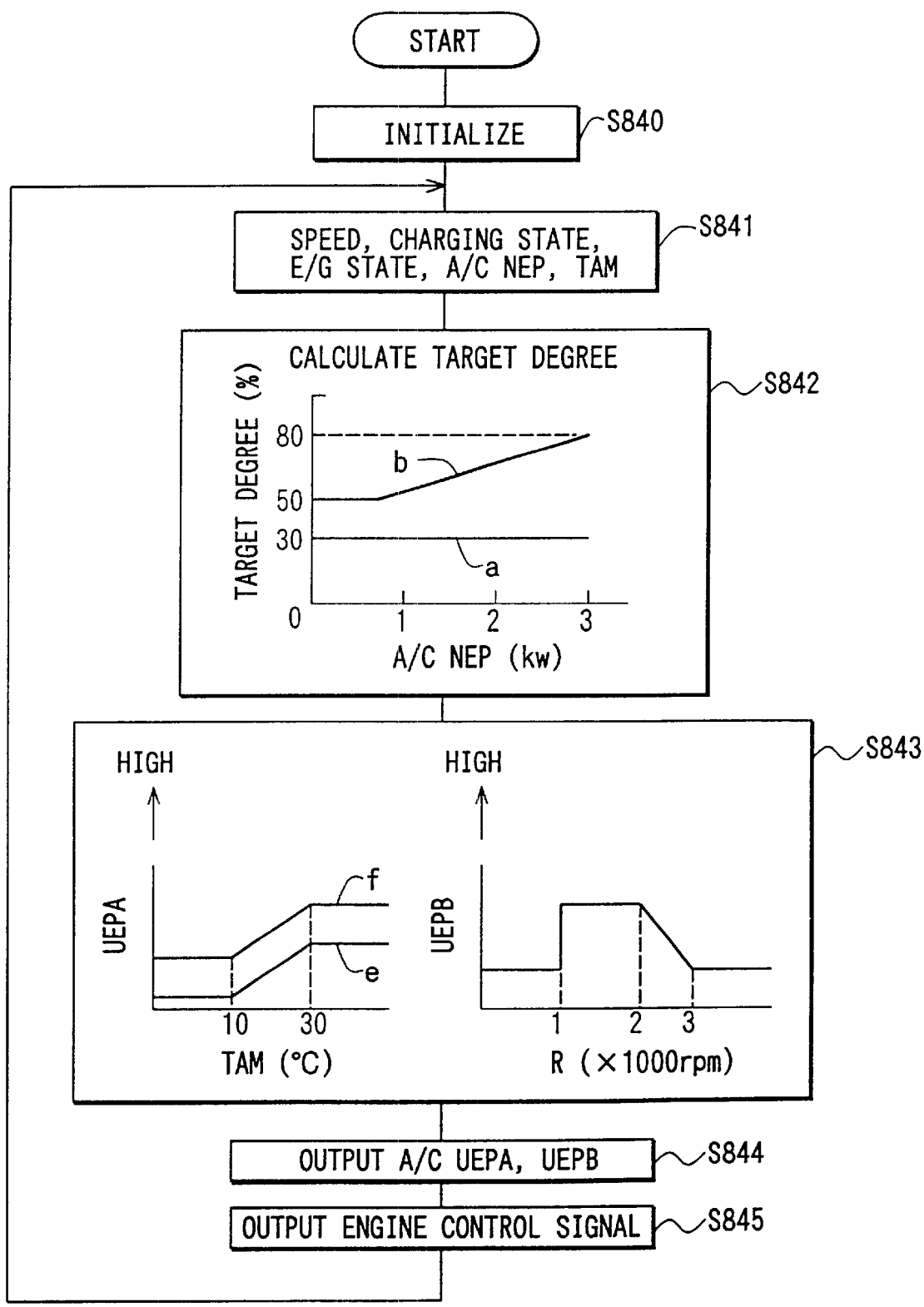
FIG. 11 is a flow diagram showing control processes of an air conditioner according to a fifth embodiment of the present invention.

As shown in FIG. 11, at step S840, the initial setting is performed. Thereafter, at step S841, the vehicle speed, the residual charging degree of the battery 4, and the pedaled amount of the accelerator pedal are calculated. In addition, the air-conditioning necessary electrical power NEP of the air conditioning unit 6 and the outside air temperature TAM are inputted to the air-conditioning controller 7. At step S842, the target degree of the battery 4 is calculated based on the air-conditioning necessary electrical power NEP and the state of the engine 1. For example, when the engine 1 stops, the target degree is set at 30%, as indicated by the line "a" shown in FIG. 9, irrespective of the air-conditioning necessary electrical power NEP. On the other hand, when the engine 1 operates, the target degree is gradually increased from 50% to 80%, as indicated by the line "b" in FIG. 11, as the air-conditioning necessary electrical power NEP increases.

Next, at step S843, a first air-conditioning usable electrical power (A/C UEPA) is calculated in accordance the outside air temperature TAM and the engine state, and a second air-conditioning usable electrical power (A/C UEPB) is calculated in accordance with the engine rotation speed R. The first air-conditioning usable electrical power UEPA is calculated in accordance-with the characteristic graph "e" when the engine 1 stops, and is calculated in accordance with the characteristic graph "f" when the engine operates. That is, the first air-conditioning usable electrical power UEPA is set lower when the engine 1 stops, as compared with in a case where the engine 1 operates. In addition, the first air-conditioning usable electrical power UEPA is set at a low constant value when the outside air temperature TAM is equal to or lower than 10° C., for example. When the outside air temperature TAM is in a range between 10° C. and 30° C., for example, the first air-conditioning usable electrical power UEPA gradually increases as the outside air temperature TAM increases. Further, the first air-conditioning usable electrical power UEPA is set at a high constant value when the outside air temperature TAM is equal to or higher than 30° C., for example.

On the other hand, the second air-conditioning usable electrical power UEPB is set at a low constant value when the engine rotation speed R is equal to or lower than 100 rpm, for example. When the engine rotation speed R is in a range between 1000 rpm and 200 rpm, for example, the second air-conditioning usable electrical power UEPB is set at a high constant value. When the engine rotation speed R is in a range between 2000 rpm and 300 rpm, for example, the second air-conditioning usable electrical power UEPB is set to be gradually smaller as the engine rotation speed R increases. Further, when the engine rotation speed R is equal to or larger than 3000 rpm, for example, the second air-conditioning usable electrical power UEPB is set at the low constant value. Next, at step S844, both the first and second air-conditioning usable electrical powers UEPA, UEPB are output to the air conditioning controller 7. Then, at step S845, a control signal is output to the engine controller 3 so that the residual charging degree of the battery 4 reaches to the target degree calculated at step S843.

Figure 12:
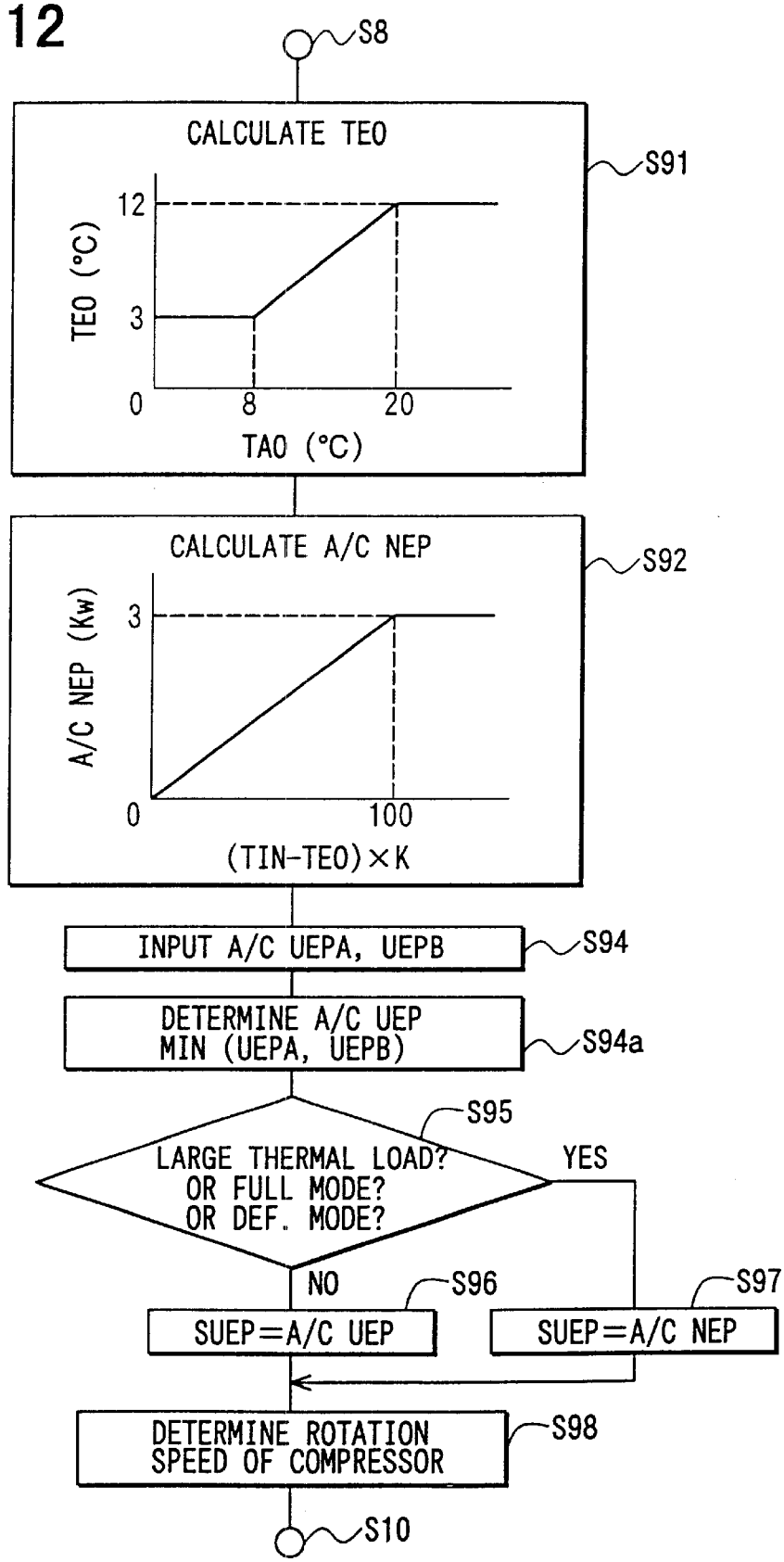
FIG. 12 is a flow diagram showing a detail control at step S9 in FIG. 5, according to the fifth embodiment.

FIG. 12 shows control processes of the air conditioning controller 7 according to the fifth embodiment. In the fifth embodiment, step S93 in FIG. 6 is omitted and step S94a is added, as compared with the above-described first embodiment. That is, in FIG. 12, both the first and second air-conditioning usable electrical powers A, B are input at step S94, and lower value among the first and second air-conditioning usable electrical powers A, B is set at the air-conditioning usable electrical power UEP.

Next, when the determination result of step S95 is YES, the set usable electrical power SUEP is set at the air-conditioning necessary electrical power NEP, and the rotation speed of the electrical compressor 41 is determined based on the set usable electrical power SUEP. On the other hand, when the determination result is NO, the set usable electrical power SUEP is set at the air-conditioning usable electrical power UEP determined at step S94a, and the rotation speed of the electrical compressor 41 is determined based on the set usable electrical power SUEP.

According to the fifth embodiment of the present invention, at step S843, the first air-conditioning usable electrical power UEPA is set lower when the engine 1 stops, as compared with a case when the engine 1 operates. Therefore, the load applied to the battery 4 can be made smaller when the engine 1 stops, so that the engine stop time can be made longer. Further, at step S843, in the low outside air temperature under which the operation of the electrical compressor 41 is not greatly need, the first air-conditioning usable electrical power UEPA is set lower, as compared with a case under a high outside air temperature. Therefore, the load applied to the battery 4 can be made smaller in the low outside air temperature, and the engine stop time can be made longer. Accordingly, the frequency of starting the engine 1 only for charging the battery 1 is reduced, thereby improving fuel consumption efficiency and reducing an exhaust amount of environmental polluting matter.

Generally, when the rotation speed of the engine 1 is high, the running load of the vehicle becomes higher. Accordingly, in this case, the electrical motor generator 2 can generate a large driving force, and consumed electrical power becomes larger. However, in the fifth embodiment, at step S843, in the high rotation speed area of the engine 1, because the second air-conditioning usable electrical power UEPB is set lower, it can prevent electrical power consumed in the whole vehicle from becoming excessive.

In the fifth embodiment, when the rotation speed R of the engine is higher than a predetermined rotation speed (e.g., 2000 rpm), the air-conditioning capacity (usable electrical power) of the air conditioning unit can be set lower than the air-conditioning capacity when the rotation speed R of the engine is lower than the predetermined speed. Alternatively, when the running load of the vehicle is higher than a predetermined load, the air-conditioning capacity of the air conditioning unit can be set lower than the air-conditioning capacity when the running load of the vehicle is lower than the predetermined speed. Even in this case, it can prevent electrical power consumed in the whole vehicle from becoming excessive.

A sixth embodiment of the present invention will be now described with reference to FIG. 13. In the sixth embodiment, the control processes (see FIG. 7) at step S803 of the vehicle controller 5 in the first embodiment, relative to the air-conditioning control, are changed to step S803a in FIG. 13. In the sixth embodiment, the other parts are basically similar to those of the above-described first embodiment. The present invention of the sixth embodiment is also typically applied to the hybrid vehicle.

Figure 13:
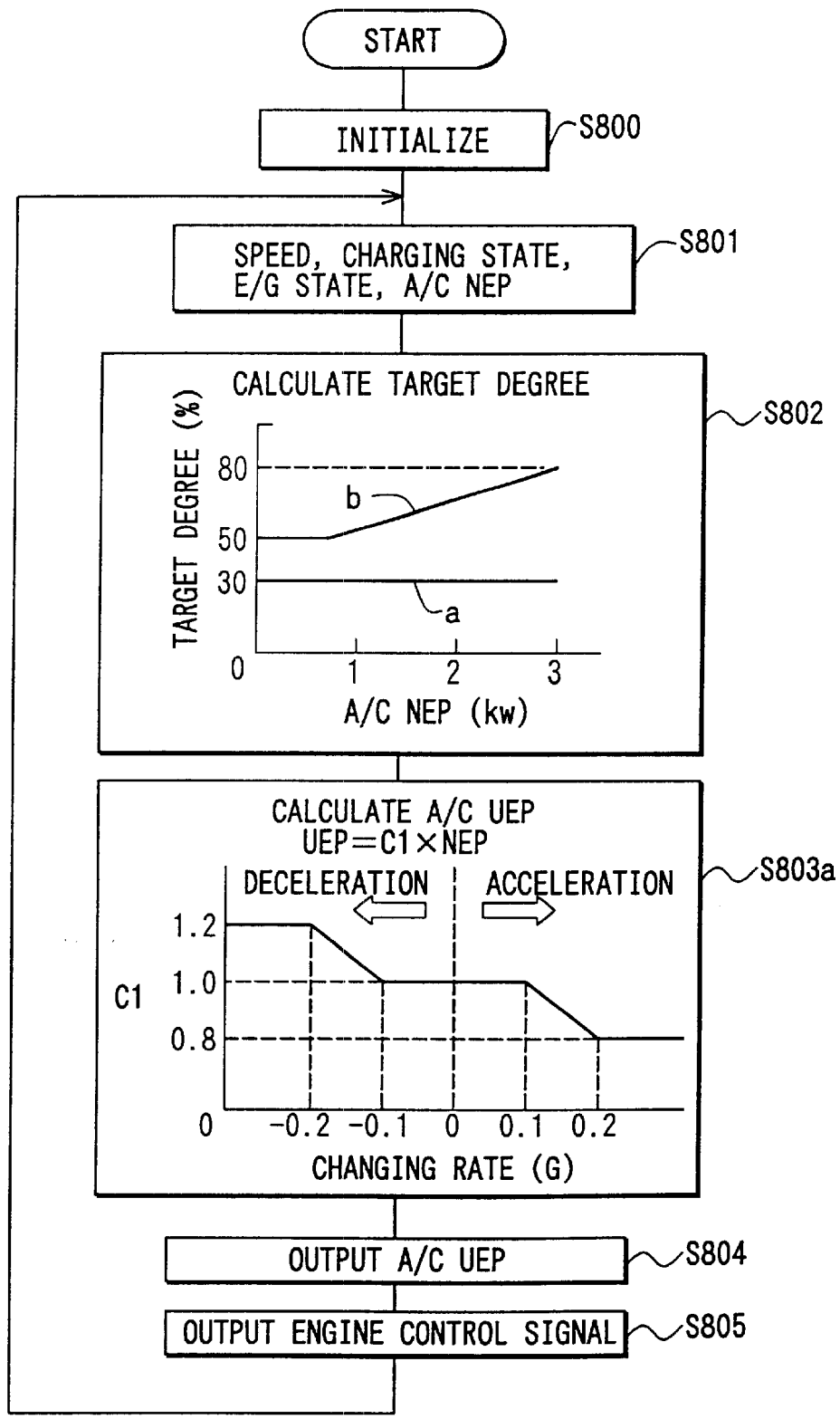
FIG. 13 is a flow diagram showing control processes of an air conditioner according to a sixth embodiment of the present invention.

At step S803a in FIG. 13, it is determined whether or not the vehicle is in an acceleration state or in a deceleration state based on the vehicle speed, and a coefficient C1 is calculated from a vehicle-speed changing rate (positive or negative acceleration) obtained based on the vehicle speed. In addition, the air-conditioning usable electrical power (UEP) is calculated by multiplying the coefficient C1 and the air-conditioning necessary electrical power NEP together.

Specifically, in the acceleration operation of the vehicle, the coefficient C1 is 1.0 when the acceleration is in a range of 0–0.1 G, the coefficient C1 is gradually reduced until 0.8 as the acceleration increases in an acceleration range between 0.1 G and 0.2 G, and the coefficient C1 is 0.8 when the acceleration is equal to or larger than 0.2 G. On the other hand, in the deceleration operation of the vehicle, the coefficient C1 is 1.0 when the deceleration is in a range of 0 and −0.1 G, the coefficient C1 is gradually increased until 1.2 as the deceleration increases in an deceleration range between −0.1 G and −0.2 G, and the coefficient C1 is 1.2 when the deceleration is equal to or larger than −0.2 G.

When the running load of the vehicle is high such as in an acceleration, because a large driving force generates in the electrical motor generator 2, it can be generally estimated that the consumed electrical power becomes larger. According to the sixth embodiment, in the acceleration of the vehicle, the air-conditioning usable electrical power UEP is set lower as compared with that in a constant speed running. Accordingly, it can prevent the electrical power consumed in the whole vehicle from becoming excessive.

On the other hand, the electrical power is generated from the electrical generator by the regenerative braking in the deceleration operation of the vehicle. At step S803a in FIG. 13, in the deceleration operation of the vehicle, the air-conditioning usable electrical power UEP can be set higher as compared with that in the constant speed running. Accordingly, the capacity of the air conditioning unit 6 can be set higher when the electrical motor generator 2 has the electrical generating function, and amenity in the passenger compartment can be improved.

In the sixth embodiment, the running load of the vehicle is estimated from the acceleration or the deceleration, and the air-conditioning usable electrical power UEP is set lower in the acceleration of the vehicle. However, the running load of the vehicle can be estimated from the pedaled amount of the accelerator pedal. In this case, the air-conditioning usable electrical power UEP can be set lower as the pedaled amount of the accelerator pedal becomes larger.

Further, when the acceleration or the pedaled amount of the accelerator pedal is larger than a predetermined value, electrical power used for the electrical compressor 41 can be set zero only for a predetermined time period. In this case, after the predetermined time passes, the operation control before the stop of the electrical compressor 41 can be restarted.

Although the present invention has been fully described in connection with preferred embodiments thereof with reference to the accompanying drawings, it is to be noted that various changes and modifications will become apparent to those skilled in the art.

For example, in the first embodiment, the target degree (charging-starting target value) of the battery 4 is changed according to whether the engine is driven or stopped at S802 shown in FIG. 7. However, the target degree of the battery 4 may be set higher when an output of the engine 1, calculated using the rotation speed and the torque of the engine 1 or estimated using the pedaled amount of the accelerator pedal, is equal to or larger than a predetermined value. That is, when the output of the engine 2 is larger than a predetermined value, the target degree may be set higher as compared with a case where the output of the engine 1 is lower than the predetermined value. Accordingly, a charging frequency of the battery 4 increases when the engine thermal efficiency is generally high, thereby improving fuel consumption efficiency and reducing an exhaust amount of environmental polluting matter. Further, since the rotation speed of the engine 1 is generally high at the high output time, power generation efficiency becomes higher.

Further, the target degree of the battery 4 can be set higher when the vehicle speed is equal to or higher than a predetermined speed, and the target degree may be set lower when the vehicle speed is lower than the predetermined speed, in the hybrid vehicle where the engine 1 is stopped as long as possible at a low speed running. Since the charging frequency of the battery 4 becomes lower at the low speed running, the frequency for starting the engine 1 only for charging the battery 4 becomes lower at the low speed running. Therefore, the starting frequency of the engine 1 is reduced at the low speed running, thereby reducing fuel consumption, the exhaust amount of environmental polluting matter and noise vibrations, and improving driving performance.

When the discharging current of the battery 4 (specifically, a current value or an electrical power value discharged from the battery 4) is large, the capacity of the air conditioning unit 6 is set lower. Therefore, electrical load, applied to the battery 4, is reduced when the discharging current of the battery 4 is larger. When the discharging current of the battery 4 is large, the possibility for driving the engine 1 is low. Accordingly, in this case, the frequency for requiring the charging of the battery 4 becomes lower. As a result, the frequency for starting the engine 1 only for the charging is reduced, thereby improving fuel consumption efficiency and reducing an exhaust amount of environmental polluting matter. On the other hand, when the discharging current is small, the capacity of the air conditioning unit 6 is set higher, thereby ensuring the amenity of the passenger compartment.

A high charging degree higher than the target degree is set, and the capacity of the air conditioning unit 6 can be set lower when the residual charging degree of the battery 4 is equal to or lower than the high charging degree. Accordingly, electrical load applied to the battery 4 is reduced as the residual charging degree of the battery 4 is reduced from the high charging degree to the target degree, thereby lengthening the time of stopping the engine 1. Therefore, the starting frequency of the engine 1 only for charging is reduced, thereby improving fuel consumption efficiency and reducing the exhaust amount of environmental polluting matter. When the residual charging degree of the battery 4 becomes higher than the high charging degree, the capacity of the air conditioning unit 6 is set higher, thereby improving the amenity in the passenger compartment.

In the first embodiment, the electrical motor generator 2 having the electrical motor function and the power generator function is used as an electrical generating unit. However, an electrical motor having the electrical motor function and a power generator having the power generator function may be provided separately from each other, and the electrical generating unit may be constructed by the electrical motor and the power generator.

In the above-described embodiments, in order to lowery set the capacity of the air conditioning unit 6, the electrical power used for the air conditioning unit 6 can be restricted to be equal to or lower than the air-conditioning necessary electrical power NEP, or the target evaporator air temperature TEO (refer to the step S91 shown in FIG. 6) can be set higher in the economy mode than in the full mode at the cooling operation.

In the above-described embodiment, when the vehicle speed is equal to or lower than a predetermined speed, the capacity of the air conditioning unit 6 can be set lower than that when the vehicle speed is higher than the predetermined speed. Further, in the discharging running mode where the possibility for driving the engine is low, the capacity of the air conditioning unit 6 can be set lower than that in the charging running mode where the possibility for driving the engine is high.

When sufficient heating performance cannot be obtained only by using the cooling water of the engine 1, an electrical heater such as a PCT heater can be added as a heat source for heating air. In this case, the air-conditioning necessary electrical power NEP is calculated while involving electrical power consumed by the electrical heater.

The present invention described in the above embodiments can be applied to a heat pump system where a heating function can be also obtained. For example, in the heat pump system, a refrigerant flow can be switched so that the functions of the condenser 42 and the evaporator 45 in the refrigerant cycle system 40 can be reversed.

The evaporator suction air temperature TIN can be calculated using the inside air temperature, the outside air temperature and the mixing ratio of the inside air amount to the outside air amount. In this case, the evaporator suction air temperature sensor 74 can be omitted.

When the electrical motor generator 2 is used as the motor function for running the vehicle, the capacity of the air conditioning unit 6 can be set lower as compared with a case where the electrical motor generator 2 is used as the power generating function. That is, when the electrical power is consumed in the electrical motor generator 2, the capacity of the air conditioning unit 6 is set lower so that electrical power consumed in the air conditioning unit 6 can be restricted. Therefore, it can prevent the electrical power consumed in the whole vehicle from becoming excessive. Accordingly, the load applied to the battery 4 becomes lower, the charging frequency of the battery 4 becomes lower, and the frequency of starting the engine 1 only for charging becomes lower. Therefore, the starting frequency of the engine 1 is reduced, fuel consumption efficiency is improved, and an exhaust amount of environmental polluting matter can be reduced. On the other hand, when the electrical motor generator 2 is used as the electrical generating function, the capacity of the air conditioning unit 6 is set higher so that air-conditioning performance of the air conditioning unit 6 can be improved.

The present invention can be applied to a fuel battery vehicle having a fuel battery. Even in this case, when the fuel battery is in a non-power generation state, the capacity of the air conditioning unit 6 is set lower as compared with a case where the fuel battery is in a power generation state. Accordingly, a switching frequency from the non-power generation state to the power generation state can be made lower.

Such changes and modifications are to be understood as being within the scope of the present invention as defined by the appended claims.

What is claimed is:

1. An air conditioner for a hybrid vehicle, the hybrid vehicle having an engine for running the vehicle, an electrical motor generator for running the vehicle and for generating electrical power, and a battery for supplying electrical power to the electrical motor generator, the air conditioner comprising:

an air conditioning unit, to which electrical power is supplied from the battery, for performing air-conditioning operation in a passenger compartment of the vehicle; and a control unit for controlling operation of the air conditioning unit, wherein:

the control unit controls operation of the engine according to a vehicle running condition;

when a residual charging degree of the battery becomes equal to or lower than a target degree, the electrical motor generator is driven by the engine to charge the battery; and the target degree is set by the control unit to be higher while the engine operates, than the target degree while the engine stops.

2. The air conditioner according to claim 1, wherein:

when an output of the engine is equal to or higher than a predetermined value, the target degree is set higher than that when the output of the engine is lower than the predetermined value.

3. The air conditioner according to claim 1, wherein:

when a vehicle speed is equal to or lower than a predetermined speed, the target degree is set lower than that when the vehicle speed is higher than the predetermined speed.

4. The air conditioner according to claim 1, wherein:

the target degree is set higher in a first running mode where a possibility for driving the engine is high, than that in a second running mode where the possibility for driving the engine is low.

5. The air conditioner according to claim 1, wherein:

when a discharging degree of the battery is equal to or higher than a predetermined degree, the target degree is set lower than that when the discharging degree of the battery is lower than the predetermined degree.

6. The air conditioner according to claim 1, wherein:

the control unit calculates air-conditioning necessary electrical power, required for the air conditioning unit for adjusting a temperature in the passenger compartment at a set temperature; and the target degree is set higher as the air-conditioning necessary electrical power increases.

7. The air conditioner according to claim 1, wherein:

the air conditioning unit includes a refrigerant cycle system in which refrigerant circulates; and the refrigerant cycle system includes an electrical compressor, operated using electrical power supplied from the battery, for compressing refrigerant.

8. The air conditioner according to claim 1, wherein the electrical motor generator has an electrical motor function for running the vehicle, and a power generator function for generating electrical power.

9. The air conditioner according to claim 1, wherein:

the electrical motor generator includes an electrical motor having an electrical motor function and a power generator having a power generating function that are provided separately from each other.

10. An air conditioner for a hybrid vehicle, the hybrid vehicle having an engine for running the vehicle, an electrical motor generator for running the vehicle and for generating electrical power, and a battery for supplying electrical power to the electrical motor generator, the air conditioner comprising:

an air conditioning unit, to which electrical power is supplied from the battery, for performing air-conditioning operation in a passenger compartment of the vehicle; and a control unit for controlling operation of the air conditioning unit, wherein:

the control unit controls operation of the engine according to a vehicle running condition;

when a residual charging degree of the battery becomes equal to or lower than a target degree, the electrical motor generator is driven by the engine to charge the battery; and the control unit controls air-conditioning capacity of the air conditioning unit to be lower while the engine stops, than the air-conditioning capacity while the engine operates.

11. The air conditioner according to claim 10, wherein:

when a vehicle speed is equal to or lower than a predetermined speed, the air-conditioning capacity of the air conditioning unit is set lower than that when the vehicle speed is higher than the predetermined speed.

12. The air conditioner according to claim 10, wherein:

when a discharging degree of the battery is equal to or higher than a predetermined degree, the air-conditioning capacity of the air conditioning unit is set lower than that when the discharging degree of the battery is lower than the predetermined degree.

13. The air conditioner according to claim 10, wherein the air-conditioning capacity of the air conditioning unit is set lower in a first running mode where a possibility for driving the engine is low, than that in a second running mode where the possibility for driving the engine is high.

14. The air conditioner according to claim 10, wherein:

when the residual charging degree of the battery is equal to or lower than a predetermined charging degree that is higher than the target degree, the air-conditioning capacity of the air conditioning unit is set lower than the air-conditioning capacity when the residual charging degree of the battery is higher than the predetermined charging degree.

15. The air conditioner according to claim 10, wherein:

when a rotation speed of the engine is equal to or higher than a predetermined rotation speed, the air-conditioning capacity of the air conditioning unit is set lower than the air-conditioning capacity when the rotation speed of the engine is lower than the predetermined rotation speed.

16. The air conditioner according to claim 10, wherein:

when a running load of the vehicle is equal to or higher than a predetermined load, the air-conditioning capacity of the air conditioning unit is set lower than the air-conditioning capacity when the running load is lower than the predetermined load.

17. The air conditioner according to claim 10, wherein:

when the electrical motor generator is used for running the vehicle, the air-conditioning capacity of the air conditioning unit is set lower than the air-conditioning capacity when the electrical motor generator is used for generating electrical power.

18. The air conditioner according to claim 10, wherein:

the control unit forbids to set lower the air-conditioning capacity of the air conditioning unit, in any one mode of a large air-conditioning load mode where an air-conditioning load is larger than a predetermined load, a defroster mode where air is blown toward a vehicle windshield, and a full mode where air-conditioning unit is operated while an amenity in the passenger compartment is mainly considered.

19. The air conditioner according to claim 10, wherein:

the control unit calculates air-conditioning necessary electrical power, required for the air conditioning unit for adjusting a temperature in the passenger compartment at a set temperature; and the control unit sets an electrical power used for the air conditioning unit at a predetermined value lower than the air-conditioning necessary electrical power, so that the air-conditioning capacity of the air conditioning unit is set lower.

20. The air conditioner according to claim 10, wherein:

the air conditioning unit includes a refrigerant cycle system in which refrigerant circulates; and the refrigerant cycle system includes an electrical compressor, operated using electrical power supplied from the battery, for compressing refrigerant.

\* \* \* \* \*